(12) United States Patent
Royle et al.

(10) Patent No.: US 8,125,210 B2
(45) Date of Patent: Feb. 28, 2012

(54) DETECTOR FOR CALCULATING THE DEPTH OF A BURIED CONDUCTOR

(75) Inventors: John Mark Royle, Exeter (GB); Richard David Pearson, Bristol (GB)

(73) Assignee: Radiodetection Limited, Bristol (GB)

( * ) Notice: Subject to any disclaimer, the term of this patent is extended or adjusted under 35 U.S.C. 154(b) by 257 days.

(21) Appl. No.: 12/396,411

(22) Filed: Mar. 2, 2009

(65) Prior Publication Data
US 2010/0001714 A1    Jan. 7, 2010

(30) Foreign Application Priority Data
Mar. 3, 2008 (GB) .................................. 0803991.9

(51) Int. Cl.
*G01R 19/00* (2006.01)
(52) U.S. Cl. .......................................... 324/67; 324/326
(58) Field of Classification Search .................. None
See application file for complete search history.

(56) References Cited

U.S. PATENT DOCUMENTS

| | | | |
|---|---|---|---|
| 4,220,913 A | 9/1980 | Howell et al. | |
| 4,542,344 A * | 9/1985 | Darilek et al. | 324/326 |
| 5,231,355 A * | 7/1993 | Rider et al. | 324/326 |
| 5,541,516 A | 7/1996 | Rider et al. | |
| 5,920,194 A | 7/1999 | Lewis et al. | |
| 6,815,953 B1 | 11/2004 | Bigelow | |
| 7,336,078 B1 | 2/2008 | Merewether et al. | |
| 2004/0027129 A1 | 2/2004 | Cull | |
| 2004/0227517 A1 | 11/2004 | Mizuno | |
| 2006/0178849 A1 | 8/2006 | Maier et al. | |
| 2006/0284610 A1* | 12/2006 | Thompson et al. | 324/67 |
| 2007/0290672 A1 | 12/2007 | Worsley et al. | |

FOREIGN PATENT DOCUMENTS

| | | |
|---|---|---|
| EP | 0119708 A2 | 9/1984 |
| EP | 0685078 A2 | 9/1994 |
| EP | 1859302 A2 | 8/2006 |
| JP | 7253475 A | 10/1995 |

* cited by examiner

*Primary Examiner* — Minh N Tang
(74) *Attorney, Agent, or Firm* — Baker & Hostetler LLP

(57) ABSTRACT

A detector for calculating a depth of a buried conductor is provided. The detector includes a plurality of antennas for detecting an electromagnetic field radiated by the conductor and one or more signal processors for calculating the depth of the conductor based on the field detected by the antennas. The calculated depth of the conductor is displayed when one or more predetermined criteria are satisfied.

36 Claims, 3 Drawing Sheets

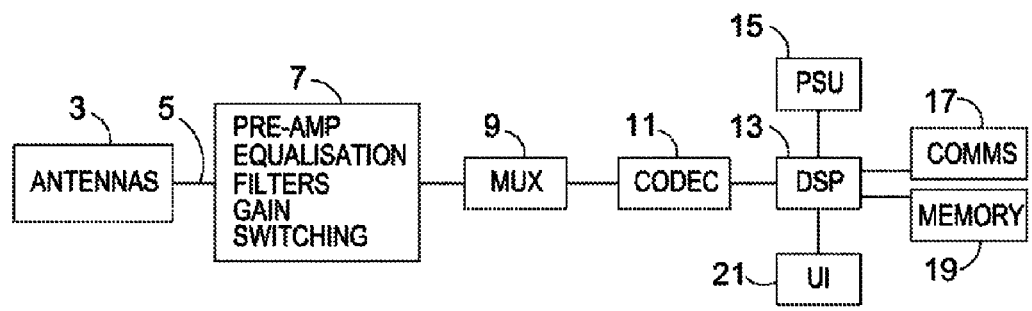
Fig.1
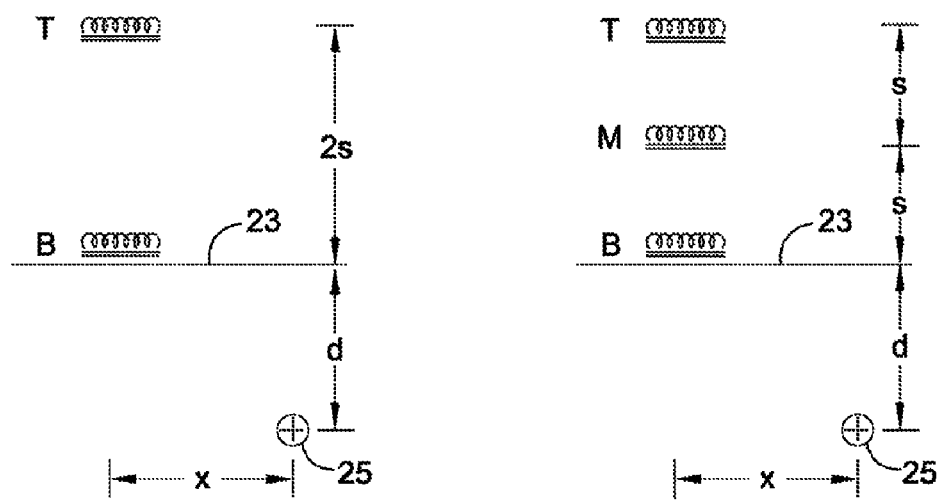
Fig.2
(Prior Art)
Fig.3

DETECTOR FOR CALCULATING THE DEPTH OF A BURIED CONDUCTOR

CROSS REFERENCE TO RELATED APPLICATIONS

This application claims priority to United Kingdom Patent Application GB 0803991.9, filed on Mar. 3, 2008, and entitled "A Detector for Calculating the Depth of a Buried Conductor," the disclosure of which is incorporated herein by reference in its entirety.

FIELD OF THE INVENTION

The present invention relates to a detector for calculating the depth of a buried conductor.

BACKGROUND OF THE INVENTION

Before commencing excavation or other work where electrical cables, fibre optic cables or other utilities ducts or pipes are buried, it is important to determine the location of such buried cables or pipes to ensure that they are not damaged during the work. Once a buried utility is located the depth of the utility can be calculated to determine a safe excavation depth.

Current carrying conductors emit electromagnetic radiation which can be detected by an electrical antenna. If fibre optic cables or non-metallic utilities ducts or pipes are fitted with a small electrical tracer line, an alternating electrical current can be induced in the tracer line which in turn radiates electromagnetic radiation. It is known to use detectors to detect the electromagnetic field emitted by conductors carrying alternating current.

One type of such detector works in one of two modes, namely 'active' or 'passive' modes. Each mode has its own frequency bands of detection.

The passive mode comprises 'power' mode and 'radio' mode. In power mode, the detector detects the magnetic field produced by a conductor carrying an AC mains power supply at 50/60 Hz, or the magnetic field re-radiated from a conductor as a result of a nearby cable carrying AC power, together with higher harmonics up to about 5 KHz. In radio mode, the detector detects very low frequency (VLF) radio energy which is re-radiated by buried conductors. The source of the original VLF radio signals is a plurality of VLF long wave transmitters, both commercial and military.

In the active mode, a signal transmitter produces an alternating magnetic field of known frequency and modulation, which induces a current in a nearby buried conductor. The signal transmitter may be directly connected to the conductor or, where direct connection access is not possible, a signal transmitter may be placed near to the buried conductor and a signal may be induced in the conductor. The buried conductor re-radiates the signal produced by the signal transmitter.

SUMMARY OF THE INVENTION

Embodiments of the present invention advantageously provide a detector for calculating the depth of a buried conductor, and an associated method.

According to a first aspect of the invention there is provided a detector for calculating a depth of a buried conductor, the detector comprising: a plurality of antennas for detecting an electromagnetic field radiated by said conductor; means for calculating the depth of said conductor based on the field detected by the antennas; and means for displaying the calculated depth of said conductor, wherein the detector is configured such that the calculated depth is only displayed when one or more predetermined criteria are satisfied.

The detector may further comprise means for calculating an angle $\theta$ between the vertical and a line joining said conductor to the detector, wherein a predetermined criterion is the angle $\theta$ is within $\pm 10°$, preferably within $\pm 5°$ and preferably within $\pm 2°$.

The detector may further comprise means for calculating an angle $\phi$ between an axis of said conductor and a plane perpendicular to an axis of the antennas, wherein a predetermined criterion is the angle $\phi$ is within $\pm 10°$, preferably within $\pm 5°$ and preferably within $\pm 2°$.

The detector may further comprise means for calculating the second derivative of the phase of the electromagnetic fields detected at the antennas, wherein a predetermined criterion is the second derivative of the phase is less than $0.5/s^2$, preferably less than $0.2/s^2$ and preferably less than $0.1°/s^2$.

The detector may further comprise means for calculating the standard deviation of the depth calculation referred to a 10 Hz bandwidth, wherein a predetermined criterion is the standard deviation of the depth calculation should be less than 5%, preferably less than 2% and preferably less than 1%.

The detector may further comprise an analogue to digital converter, ADC, having a dynamic range for digitising signals output from the antennas, wherein a predetermined criterion is the signals input to the ADC are within the dynamic range of the ADC.

The detector may further comprise means for calculating a first derivative of a magnitude of the field detected at the antennas, wherein a predetermined criterion is the first derivative of the magnitude of the field detected at the antennas is less than 5% of the signal/s, preferably less than 2% of the signal/s and preferably less than 1% of the signal/s.

The detector may further comprise means for calculating phase correlation across the antennas, wherein a predetermined criterion is the phase difference between the antennas is less than 5°, preferably less than 2° and preferably less than 1°.

According to a second aspect of the invention there is provided a method of calculating a depth of a buried conductor, the method comprising: providing a plurality of antennas for detecting an electromagnetic field radiated by said conductor; calculating the depth of said conductor based on the field detected by the antennas; and providing a display device for displaying the calculated depth of said conductor, wherein the calculated depth is displayed on the display device when one or more predetermined criteria are satisfied.

The method may further comprise calculating an angle $\theta$ between the vertical and a line joining said conductor to the detector, wherein a predetermined criterion is the angle $\theta$ is within $\pm 10°$, preferably within $\pm 5°$ and preferably within $\pm 2°$.

The method may further comprise calculating an angle $\phi$ between an axis of said conductor and a plane perpendicular to an axis of the antennas, wherein a predetermined criterion is the angle $\phi$ is within $\pm 10°$, preferably within $\pm 5°$ and preferably within $\pm 2°$.

The method may further comprise calculating the second derivative of the phase of the electromagnetic fields detected at the antennas, wherein a predetermined criterion is the second derivative of the phase is less than $0.5°/s^2$, preferably less than $0.2/s^2$ and preferably less than $0.1/s^2$.

The method may further comprise calculating the standard deviation of the depth calculation referred to a 10 Hz bandwidth, wherein a predetermined criterion is the standard deviation of the depth calculation should be less than 5%, preferably less than 2% and preferably less than 1%.

The method may further comprise providing an analogue to digital converter, ADC, having a dynamic range for digitising signals output from the antennas, wherein a predetermined criterion is the signals input to the ADC are within the dynamic range of the ADC.

The method may further comprise calculating a first derivative of a magnitude of the field detected at the antennas, wherein a predetermined criterion is the first derivative of the magnitude of the field detected at the antennas is less than 5% of the signal/s, preferably less than 2% of the signal/s and preferably less than 1% of the signal/s.

The method may further comprise calculating phase correlation across the antennas, wherein a predetermined criterion is the phase difference between the antennas is less than 5°, preferably less than 2° and preferably less than 1°.

According to a third aspect of the invention there is provided a carrier medium carrying computer readable code for controlling a microprocessor to carry out the method described above.

According to a fourth aspect of the invention there is provided a detector for calculating a depth of a buried conductor, the detector comprising: a plurality of antennas for detecting an electromagnetic field radiated by said conductor; a microprocessor configured to calculate the depth of said conductor based on the field detected by the antennas; and a display device for displaying the calculated depth of said conductor, wherein the detector is configured such that the calculated depth is displayed on the display device when one or more predetermined criteria are satisfied.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 1 is a block diagram of a detector according to an embodiment of the invention.

FIG. 2 is a schematic representation of two horizontal antennas of a known detector.

FIG. 3 is a schematic representation of three of the antennas of the detector of FIG. 1.

DETAILED DESCRIPTION

Figure 4:
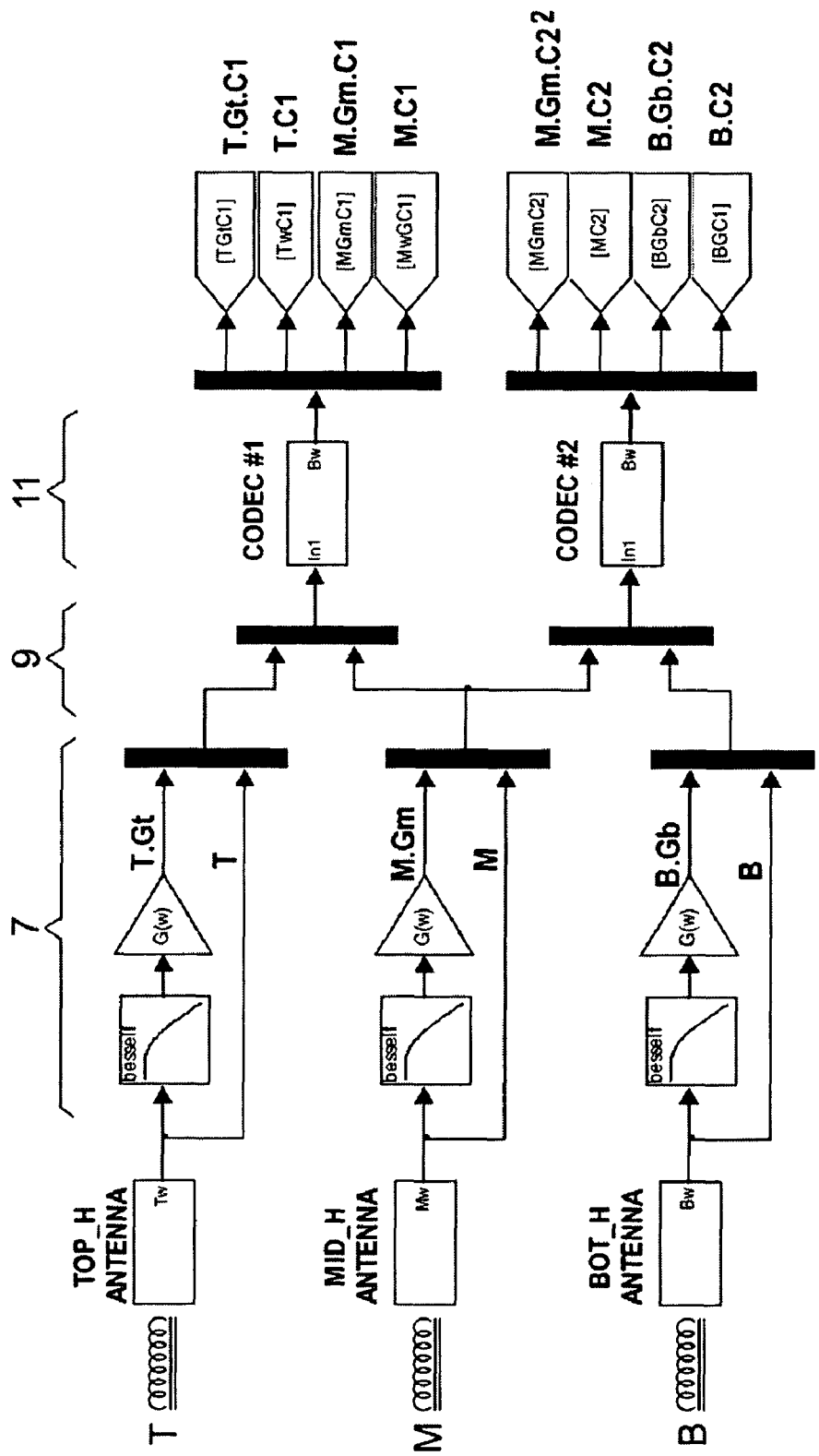
FIG. 4 is a block diagram of part of the detector of FIG. 1 which processes the signals detected by the antennas of FIG. 3.

The invention will now be described with reference to the drawing figures, in which like reference numerals refer to like parts throughout.

FIG. 1 is a block diagram of a portable detector 1 according to an embodiment of the invention. The detector 1 comprises five antennas 3 for detecting an electromagnetic signal radiated by a current carrying conductor. Each antenna 3 converts the electromagnetic field at the antenna into a field strength signal 5 which is output from the antenna 3.

Each antenna output is passed to a pre-amplification and switching stage 7. If the strength of the field strength signal 5 is low then the output from the antenna 3 is amplified and filtered with an equalization filter. If the field strength signal 5 output from the antenna 3 is adequate then the signal is fed directly into the next stage of the detector 1. In addition to the outputs from the antennas 3, other inputs can be directly applied to the detector 1 for example from accessories such as clamps, stethoscopes, underwater-probes and an A-frame for fault finding.

The output from the pre-amplification and switching stage 7 is fed into a super-heterodyne mixer 9. The mixer circuit is designed to recover full magnitude and phase information from the carrier.

The output from the mixers 9 are fed into a CODEC 11. The CODEC 11 is a 24-bit stereo delta-sigma analogue to digital converter (ADC). This is a relatively cheap device and has a poor absolute accuracy of +1% but excellent ratiometric accuracy. However, the way that the CODEC 11 is used in the present invention makes it an ideal ADC as described below. The CODEC 11 over-samples the field strength signals at up to 96 KHz. The output of the CODEC 11 is fed into a digital signal processing block 13 which is comprised of a digital signal processor (DSP) and a field programmable date array (FPGA).

The detector 1 further comprises a power supply unit (PSU) 15 comprising a power source such as batteries and power management circuitry. A communications module 17 is provided to allow the detector 1 to be connected to a personal computer (PC) or personal digital assistant (PDA) to upload data stored in the detector 1 and to allow download from the PC/PDA to the detector 1, for example software updates. The detector 1 further comprises a memory module 19 and a user interface module 21. The user interface module 21 may comprise one or more of a display for displaying information to the operator of the device, input devices such as a keypad or a touch sensitive screen and audible output devices such as a speaker or beeper. The components of the portable detector 1 are housed in a housing (not shown).

FIG. 2 is a schematic representation of two horizontal vertically spaced antennas B, T of a known detector within an elongate vertically held housing (not shown). In use the detector is held vertical on ground 23 in which a current carrying conductor 25 is buried with the bottom antenna B close to the surface of the ground 23. The axes of the antennas are parallel and the separation between the bottom antenna B and the top antenna T is 2 s. The conductor 25 is buried at a depth d below the surface of the ground 23 (and below the bottom antenna B) and the horizontal displacement between the antennas B and T and the conductor 25 is x.

When alternating current flows in the conductor 25 the conductor 25 radiates an electromagnetic field. The magnetic flux density or magnetic field at the bottom antenna $B_B$ and the top antenna $B_T$ due to the electromagnetic field produced by the current carrying conductor 25 are respectively given by:

$$B_B(x, d) = \frac{\mu_0 i d}{2\pi(d^2 + x^2)} + C \quad (1)$$

and $$B_T(x, d) = \frac{\mu_0 i(d + 2s)}{2\pi((d + 2s)^2 + x^2)} + C \quad (2)$$

where:
$\mu_0$ is the permeability of free space;
i is the current flowing in the conductor 25; and
C is a frequency dependent variable, known as the common mode field distortion.

Common mode field distortion is distortion of the electromagnetic field produced by the buried current carrying conductor 25 due to the complex impedance of the material in which the current carrying conductor 25 is buried. As the ground has a distributed complex impedance, the common mode field distortion results is a homogenous distortion of the signal due to return current through the ground. The complex impedance of the ground varies for different materials such as dry soil, wet clay and sand. For example, at a frequency of 83 KHz when the conductor is buried at a depth of 1.7 m in wet clay the contribution of C gives a 34% variation to the theoretical value of B.

The depth of a buried conductor based on magnetic flux density measurements $B_B$ and $B_T$ is:

$$d = \frac{2s}{\frac{B_B(x, d)}{B_T(x, d)} - 1} \quad (3)$$

Substituting equations (1) and (2) into equation (3) when x=0, i.e., when the detector is directly above the current carrying conductor 25 gives:

$$d = \frac{2s}{\frac{\frac{\mu_0 i}{2\pi d} + C}{\frac{\mu_0 i}{2\pi(d+2s)} + C} - 1} \quad (4)$$

As can be seen from equation (4), the depth calculation using two antennas is dependent on the common mode field distortion which leads to practical difficulties in determining the depth of a buried conductor. This difficulty is mitigated in conventional apparatus by deploying a compensation algorithm which approximates the common mode field distortion based on measurements from different sites to give a function C for an 'average' soil type. This approximation is not satisfactory due to the significant difference in measurements of up to 35% between wet clay and dry sand, which in general leads to an underestimate of the depth of a buried current carrying conductor.

FIG. 3 is a schematic representation of three horizontal vertically spaced antennas T, M, B of the detector 1 of FIG. 1. The axes of the antennas are parallel. The middle antenna M is disposed midway between the bottom antenna B and top antenna T at a separation s from each antenna so that the separation between the bottom antenna B and the top antenna T is 2 s. As in FIG. 2, the conductor 25 is buried at a depth d below the surface of the ground 23 (and below the bottom antenna B) and the horizontal displacement between the antennas T, M, B and the conductor is x. The magnetic flux density at the middle antenna $B_M$ is given by:

$$B_M(x, d) = \frac{\mu_0 i(d + s)}{2\pi((d + s)^2 + x^2)} + C \quad (5)$$

In practice, the depth of a current carrying conductor is calculated when the antennas are vertically above the conductor, i.e., when the lateral displacement, x, is zero. Equations (1), (2) and (5) become:

$$B_B = \frac{\mu_0 i}{2\pi d} + C \quad (6)$$

$$B_T = \frac{\mu_0 i}{2\pi(d + 2s)} + C \quad (7)$$

$$B_M = \frac{\mu_0 i}{2\pi(d + s)} + C \quad (8)$$

A convenient ratio R to consider is given by:

$$R = \frac{B_B - B_M}{B_B - B_T} \quad (9)$$

Replacing equations (6), (7) and (8) into equation (9) gives.

$$R = \frac{\frac{\mu_0 i}{2\pi d} + C - \frac{\mu_0 i}{2\pi(d+s)} + C}{\frac{\mu_0 i}{2\pi d} + C - \frac{\mu_0 i}{2\pi(d+2s)} + C} \quad (10)$$

The ratio R is in effect a second derivative gradient term and is independent of the common mode distortion C. Simplifying equation (10) gives:

$$R = \frac{\frac{1}{d} - \frac{1}{d+s}}{\frac{1}{d} - \frac{1}{d+2s}} = \frac{\frac{1}{d+s}}{\frac{2}{d+2s}} = \frac{d + 2s}{2(d + s)} \quad (11)$$

Solving equation (11) for d gives the three antenna depth equation:

$$d = \frac{2s(1 - R)}{2R - 1} \quad (12)$$

Hence, equations (9) and (12) provide a means of calculating the depth of a current carrying conductor 25 by comparing the magnetic field densities at the three antennas. By using the ratiometric term R, which is independent of the complex impedance of the substance in which the current carrying conductor is buried, equations (9) and (12) dispense with the need to compensate for the common mode field effect of the substance in which the current carrying conductor 25 is buried and these equations provide an improved method of calculating the depth of a buried conductor.

Equations (1), (2) and (5) apply to an infinite conductor carrying uniform current and giving a perfect radial field in a vacuum. When such a conductor is buried in soil with finite conductivity a secondary current and magnetic field are generated which is induced in the soil. An alternative model to equations (1), (2) and (5) for the field produced by a current carrying conductor is given below, which shows how equations (1), (2) and (5) depart from the theoretical pure radial field:

$$B = \frac{\mu_0 i}{2\pi d} e^{\left(-\frac{d}{\Delta(f)}\right)} \quad (13)$$

where:

$$\Delta(f) = \frac{503.8}{\sqrt{\delta(f)^\gamma}}$$

$\mu_0$ is the permeability of free space;
i is the current flowing in the conductor 25;
$\delta$ is the ground conductivity; and
$\gamma$ is a variable to allow for ground conductivity variation with frequency Assuming that the soil conductivity is homogenous, if equation (13) is substituted into equation (9) for each of the antennas it can be shown that the exponential terms cancel and that common mode field effect is eliminated in the ratiometric analysis.

A prerequisite of this ratiometric calculation is accurate calibration of the three horizontal antennas T, M, B to an accuracy of around 1 part in 600,000. The calibration of the antennas is performed with respect to the relative performance of the top and middle antennas T, M and the relative performance of the middle and bottom antennas M, B. After assembly of the detector, each antenna is in turn placed within a known magnetic field and the magnitude and phase of the field strength signal output from the antennas is measured over a range of frequencies. A calibration value for the performance ratio of the top and middle antennas and the middle and bottom antennas is calculated and stored in the memory 19 of the detector 1 so that a ratiometric calculation of the field strength signals output from the pairs of antennas is consistently accurate to around 1 part in 600,000.

FIG. 4 is a block diagram of part of the detector 1 of FIG. 1 which processes the signals detected by the antennas 3 of FIG. 3.

If the signal detected by antennas T, M, B is weak, the analogue output from each of the three antennas T, M, B is fed through an equalisation filter 7 and amplified by a factor G(w); otherwise the outputs from the antennas T, M, B are fed directly into the next stage 9 of the circuit. The next stage 9 comprises two multiplexors, the first multiplexor combining the signals from the top antenna T and middle antenna M and the second multiplexor combining the signals from the middle antenna M and the bottom antenna B.

The output from each multiplexor is then fed into a delta-sigma CODEC 11. Delta-sigma CODECs are ideal CODECs to digitise the outputs of the pairs of antennas because they provide almost perfect ratiometric accuracy (around 1 part in $2^{24}$ across the sampling bandwidth from 4 KHz to 96 KHz). Hence the implementation of equation (9) comprises feeding the output from the middle antenna M into two delta-sigma CODECs 11.

With reference to FIG. 4, when the outputs of the antennas T, M, B are not amplified equation (9) becomes:

$$R = \frac{B \cdot C2 - M \cdot C2}{B \cdot C1 - T \cdot C2} \quad (14)$$

where:
B is the output from the bottom antenna;
M is the output from the middle antenna;
T is the output from the top antenna;
C1 is the transfer function of codec 1; and
C2 is the transfer function of codec 2.

By dividing through by C2, equation (14) becomes:

$$R = \frac{B - M}{B \cdot \frac{C1}{C2} - T} \quad (15)$$

The ratio C1/C2 is evaluated by comparing the output from the middle antenna M through both CODECs 11 which allows R to be calculated.

When the outputs of the antennas T, M, B are amplified equation (9) becomes:

$$R = \frac{B \cdot G_B \cdot C2 - M \cdot G_M \cdot C2}{B \cdot G_B \cdot C1 - T \cdot G_T \cdot C2} \quad (16)$$

where:
$G_B$, $G_M$ and $G_T$ are the gain of the amplifiers for the amplified bottom, middle and top antennas respectively.

By dividing through by C2 and B. $G_B$, equation (16) becomes:

$$R = \frac{1 - \frac{M \cdot G_M}{B \cdot G_B}}{\frac{C1}{C2} - \frac{T \cdot G_T}{B \cdot G_B}}$$

By accurately calibrating $M.G_M/B.G_B$ and $T.G_T/B.G_B$ and by calculating the ratio C1/C2 by comparing the output from the middle antenna through both CODECs 11, R can be calculated.

There is also provided a method of calculating the common mode field distortion of an electromagnetic field produced by a current carrying conductor 25 due to the complex impedance of the material in which the conductor is buried. As stated above, different ground materials, such as sand, dry and wet soil and dry and wet clay, have different complex impedances. By comparing the depth measurements using the two antenna depth equation (3) and the three antenna depth equation (12) the common mode field distortion can be calculated.

In addition to common mode field distortion described above, an electromagnetic signal radiated by a current carrying conductor 25 may be distorted by secondary coupling onto a nearby conductor. Unlike common mode field distortion which is homogenous, field distortion due to coupling onto a nearby conductor leads to a non-radial field gradient and cannot be exactly compensated for.

If there is no or little distortion due to secondary coupling then the common mode field distortion calculation resulting from comparison of the two antenna depth equation (3) and the three antenna depth equation (12) should give a common mode field distortion, C, of <10% of the detected signal.

If the distortion due to secondary coupling is significant then this will affect the accuracy of some measurements and it is useful to warn the operator of significant secondary coupling distortion which results in the lessened integrity of readings made by the detector. If the common mode field distortion is calculated as ≧10% of the detected signal then this is an indication of the presence of secondary distortion and the operator of the detector 1 can be warned by a visual or audible alarm.

For conventional detectors, depth data is presented to an operator by pressing a 'calculate depth' button on the detector once the detector has been placed in the correct position. The correct position for calculating the depth is when the antennas are vertically above the conductor and the axes of the antennas are perpendicular to the axis of the buried conductor.

In practice the correct location is found by moving the detector from side to side across the conductor and rotating the detector about a vertical axis. When the detector is correctly positioned a peak response is detected by a horizontal antenna having its axis perpendicular to the axis of the conductor and a null response is detected by a vertical antenna and a horizontal antenna having their axis parallel to the axis of the conductor.

To correctly and efficiently perform depth calculation the operator must have sufficient skill and experience to accurately locate the detector vertically above and aligned with the conductor at which point the depth of the buried conductor can be accurately calculated. An inexperienced or careless operator may be presented with an erroneous depth calculation if the calculate depth button is pressed when the detector is not correctly positioned relative to the buried conductor.

The optimum location for calculating the depth of a buried conductor can be considered as a depth calculation "sweet spot". The present invention addresses the difficulty of locating the sweet spot by presenting the result of the depth calculation only when predetermined criteria are satisfied.

Figure 5:
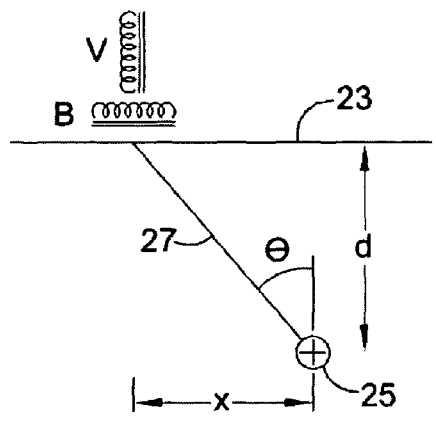
FIG. 5 is a schematic representation of two of the antennas of the detector of FIG. 1.

FIG. 5 is a schematic representation of two antennas B, V at the bottom of the detector 1 of FIG. 1. The detector 1 is located at a horizontal displacement x from the buried conductor 25 which is at a depth d below ground level 23. The bottom two antennas B, V of the detector are placed in close proximity to each other at the foot of the detector 1, one antenna B being disposed horizontally as described above and the other antenna V behind disposed vertically (when the detector 1 is held vertical), orthogonal to the bottom antenna B. A line 27 joining the buried conductor to the bottom antennas B, V is inclined at an angle θ to the vertical.

When an electromagnetic field is emitted by the buried conductor 25, current is induced in the bottom antenna B and the vertical antenna V. As these antennas are orthogonal the current induced in the antennas can be considered as representing the resolved respective horizontal and vertical components of the electromagnetic field radiated by the conductor 25. Hence, the angle θ can be calculated by considering the equation:

$$\theta = \tan^{-1}\left(\frac{B_V}{B_B}\right)$$

where:
$B_B$ is the magnetic flux density at the bottom antenna; and
$B_V$ is the magnetic flux density at the vertical antenna.

When the detector 1 is moved horizontally close to conductor 25, i.e., as the horizontal displacement x decreases, $B_V/B_B$ decreases and the arctangent, θ, also decreases towards zero.

Figure 6:
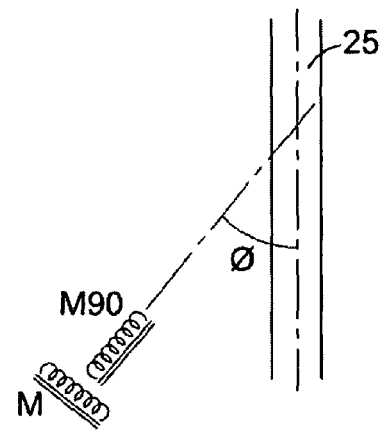
FIG. 6 is a schematic representation of a further two of the antennas of the detector of FIG. 1.

FIG. 6 is a schematic representation of a further two of the antennas M, M90 of the detector 1 of FIG. 1 viewed from above showing the first middle horizontal antenna M and a second middle horizontal antenna M90. The middle two antennas M, M90 of the detector are placed in close proximity to each other in the middle of the detector 1, both antennas M, M90 being disposed horizontally (when the detector 1 is held vertical) at right angles to each other. The detector 1 is oriented relative to the buried conductor 25 such that the middle antennas M, M90 are horizontal and the angle between the axis of the conductor 25 and the second horizontal middle antenna M90, i.e., the angle between the axis of the conductor and a plane perpendicular to the axis of the middle antenna M, is ϕ. For a peak response the axis of the first middle antenna M should be oriented vertically above and orthogonal to the buried conductor 25.

When an electromagnetic field is emitted by the buried conductor 25, current is induced in the first horizontal middle antenna M and the second horizontal middle antenna M90. As these antennas are orthogonal the current induced in the antennas can be considered as representing the resolved horizontal orthogonal components of the electromagnetic field produced by the conductor 25. Hence, the angle ϕ can be calculated by considering the equation:

$$\phi = \tan^{-1}\left(\frac{B_{M90}}{B_M}\right)$$

when the M90 is antenna is oriented "in phase" with the conductor and:

$$\phi = 180° - \tan^{-1}\left(\frac{B_{M90}}{B_M}\right)$$

when the M90 is antenna is oriented "out of phase" with the conductor,
where: $B_{M90}$ is the magnetic flux density at the second horizontal middle antenna M90 and
$B_M$ is the magnetic flux density at the first horizontal middle antenna M.

As the detector 1 is rotated about a vertical axis so that the second middle antenna M90 becomes more aligned with the conductor 25, $B_V/B_B$ decreases and the arctangent, θ, also decreases towards zero.

By monitoring the current induced in the two middle antennas M, M90 and the two bottom antennas B, V the angles θ and ϕ can be calculated. These angle calculations can be used to determine if the detector 1 is located in the depth calculation sweet spot where a depth calculation can be accurately undertaken. If it is determined that the detector 1 is located in the sweet spot then the detector 1 displays the result of the depth calculation to the user on the display 21.

Predetermined criteria indicating that the detector 1 is in the sweet spot are when the angles θ and φ are within ±10°, preferably within ±5° and preferably within ±2°.

Further parameters can be considered to verify the integrity of the depth calculation. If the parameters satisfy predetermined criteria then the depth calculation will be displayed on the display 21 of the detector 1. One or more of the following parameters may be considered and preferably all of the following parameters are evaluated and should satisfy predetermined criteria. These parameters may be considered for depth calculation based on measurements using two or three horizontal antennas, i.e., using equations (3) or (12).

Figure 7:
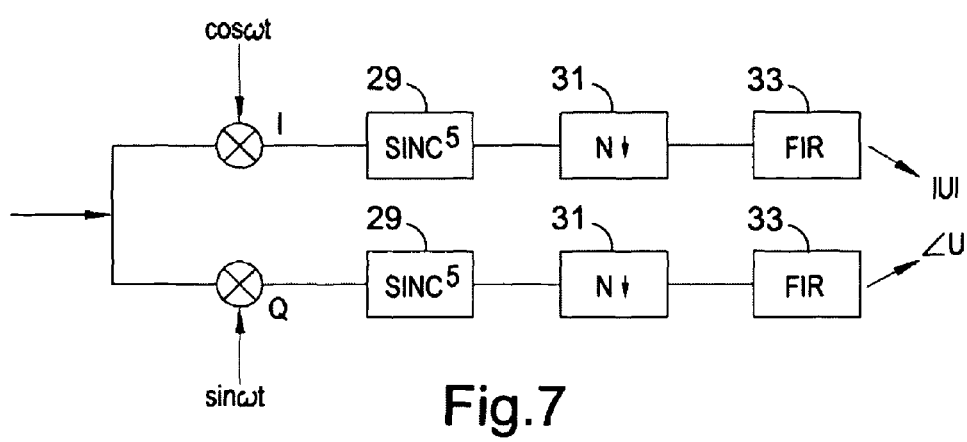
FIG. 7 is a block diagram of part of the digital signal processing block of the detector of FIG. 1.

FIG. 7 is a block diagram of part of the digital signal processing block 13 of the detector 1 of FIG. 1. The field strength signals 5 from the antennas 3 are sampled in the CODEC 11 of FIG. 1 and mixed with cos and sin components of the frequency of interest to produce in-phase "I" and quadrature "Q" components of the field strength signals detected at the antenna 3. Further details of this operation are provided in U.S. Pat. No. 6,977,508, assigned to Radiodetection Limited on its face, the contents of which are incorporated herein by reference.

The I and Q components are passed to a $sinc^5$ decimating filter 29. Further details of the operation of the $sinc^5$ decimating filter are provided in U.S. Pat. No. 6,968,296, assigned to Radiodetection Limited on its face, the contents of which are incorporated herein by reference.

The output of the $sinc^5$ decimating filter is down-sampled 31 and low-pass filtered through a finite impulse response (FIR) filter. This process results in obtaining the complex phase and magnitude of the antenna signals defined in a narrow bandwidth, typically 10 Hz. Further details of the operation of the DSP's tasks are provided in U.S. Pat. No. 6,777,923, assigned to Radiodetection Limited on its face, the contents of which are incorporated herein by reference, in U.S. Pat. No. 7,184,951, assigned to Radiodetection Limited on its face, the contents of which are incorporated herein by reference, and in U.S. Pat. No. 6,977,508 (noted above).

The magnitude of the second derivative of the phase of the signals detected by the antennas, i.e. $|d^2 \angle U/dt^2|$ is a parameter which can be considered to verify the integrity of the depth calculation. This parameter is effectively a measure of the uncorrelated noise across the bandwidth of the FIR filter and should be less than $0.5°/s^2$, preferably less than $0.2°/s^2$ and preferably less than $0.1°/s^2$.

A further parameter that can be considered to verify the integrity of the depth calculation is the standard deviation of the depth calculation. This parameter indicates that the depth calculation is stable and not unduly fluctuating due to noise. The standard deviation of the depth calculation referred to a 10 Hz bandwidth should be less than 5%, preferably less than 2% and preferably less than 1%.

A further parameter which may be considered to verify the integrity of the depth calculation is that all signals input to the CODEC are within the dynamic range of the CODEC. If the signals input to the CODEC are found to be outside the dynamic range of the CODEC then this will result in inaccurate sampling by the CODEC.

A further parameter which may be considered to verify the integrity of the depth calculation is the first derivative of the magnitude of the signals detected at the antennas, i.e., dU/dt. This parameter ensures that the instrument is being held still at the time that the depth is calculated so that this parameter acts as an anti-ballistic filter. The first derivative of the magnitude of the detected signal should be less than 5% of the signal/s, preferably less than 2% of the signal/s and preferably less than 1% of the signal/s.

A further parameter which may be considered to verify the integrity of the depth calculation is the phase correlation across the (two or three) antennas used to detect the signal radiated by the buried conductor. The phase difference between the antennas should be less than 5°, preferably less than 2° and preferably less than 1°.

One or more of the above parameters may be considered to determine that the depth calculation has good integrity. The values of the thresholds described above are dependent on the signal strength, the computing bandwidth of the FIR filters and the depth of the conductor being detected.

Various modifications will be apparent to those in the art and it is desired to include all such modifications as fall within the scope of the accompanying claims.

In the present embodiment the detector continuously calculates the depth of the buried conductor but only displays the calculated depth when predetermined criteria are satisfied. In other embodiments the detector may display an icon on its user interface or make an audible sound to inform the operator that the predetermined criteria are satisfied. Alternatively, the detector may be configured such that depth is only calculated when the predetermined criteria are satisfied.

The many features and advantages of the invention are apparent from the detailed specification, and, thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and, accordingly, all suitable modifications and equivalents may be resorted to that fall within the scope of the invention.

We claim:

1. A detector for calculating a depth of a buried conductor, the detector comprising:
   at least three antennas for detecting an electromagnetic field radiated by a buried conductor;
   means for calculating the depth of said conductor based on the field detected by the antennas; and
   means for displaying the calculated depth of said conductor,
   wherein the detector is configured such that the calculated depth is displayed on the means for displaying the calculated depth when one or more predetermined criteria are satisfied, and wherein the antennas are vertically spaced and include a top horizontal antenna, a bottom horizontal antenna and a middle horizontal antenna disposed between the top antenna and the bottom antenna at a separation s from each antenna, or, the antennas include a bottom vertical antenna, a bottom horizontal antenna, a first middle horizontal antenna and a second middle horizontal antenna oriented substantially orthogonally to the first middle horizontal antenna.

2. A detector as claimed in claim 1, further comprising means for calculating an angle θ between the vertical and a line joining a bottom of the detector to the portion of the conductor located closest to the bottom of the detector, wherein a predetermined criterion is the angle θ is within ±10°.

3. A detector as claimed in claim 1, further comprising means for calculating an angle φ between an axis of said conductor and a plane perpendicular to an axis of the antennas, wherein a predetermined criterion is the angle φ is within ±10°.

4. A detector as claimed in claim 1, further comprising means for calculating the second derivative of the phase of the electromagnetic fields detected at the antennas, wherein a predetermined criterion is the second derivative of the phase is less than $0.5°/s^2$.

5. A detector as claimed in claim 1, further comprising means for calculating the standard deviation of the depth calculation referred to a 10 Hz bandwidth, wherein a predetermined criterion is the standard deviation of the depth calculation should be less than 5%.

6. A detector as claimed in claim 1, further comprising an analogue to digital converter, ADC, having a dynamic range for digitising signals output from the antennas, wherein a predetermined criterion is the signals input to the ADC are within the dynamic range of the ADC.

7. A detector as claimed in claim 1, further comprising means for calculating a first derivative of a magnitude of the field detected at the antennas, wherein a predetermined criterion is the first derivative of the magnitude of the field detected at the antennas is less than 5%.

8. A detector as claimed in claim 1, further comprising means for calculating phase correlation across the antennas, wherein a predetermined criterion is the phase difference between the antennas is less than 5°.

9. A method of calculating a depth of a buried conductor, the method comprising:
   detecting an electromagnetic field radiated by a buried conductor using at least three antennas;
   calculating the depth of said conductor based on the field detected by the antennas;
   providing a display device for displaying the calculated depth of said conductor, and
   displaying the calculated depth on the display device when one or more predetermined criteria are satisfied, and wherein the antennas are vertically spaced and include a top horizontal antenna, a bottom horizontal antenna and a middle horizontal antenna disposed between the top antenna and the bottom antenna at a separation s from each antenna, or, the antennas include a bottom vertical antenna, a bottom horizontal antenna, a first middle horizontal antenna and a second middle horizontal antenna oriented substantially orthogonally to the first middle horizontal antenna.

10. A method as claimed in claim 9, further comprising calculating an angle θ between the vertical and a line joining a bottom of the detector to the portion of the conductor located closest to the bottom of the detector, wherein a predetermined criterion is the angle θ is within ±10°.

11. A method as claimed in claim 9, further comprising calculating an angle φ between an axis of said conductor and a plane perpendicular to an axis of the antennas, wherein a predetermined criterion is the angle φ is within ±10°.

12. A method as claimed in claim 9, further comprising calculating the second derivative of the phase of the electromagnetic fields detected at the antennas, wherein a predetermined criterion is the second derivative of the phase is less than $0.5°/s^2$.

13. A method as claimed in claim 9, further comprising calculating the standard deviation of the depth calculation referred to a 10 Hz bandwidth, wherein a predetermined criterion is the standard deviation of the depth calculation should be less than 5%.

14. A method as claimed in claim 9, further comprising providing an analogue to digital converter, ADC, having a dynamic range for digitising signals output from the antennas, wherein a predetermined criterion is the signals input to the ADC are within the dynamic range of the ADC.

15. A method as claimed in claim 9, further comprising calculating a first derivative of a magnitude of the field detected at the antennas, wherein a predetermined criterion is the first derivative of the magnitude of the field detected at the antennas is less than 5%.

16. A method as claimed in claim 9, further comprising calculating phase correlation across the antennas, wherein a predetermined criterion is the phase difference between the antennas is less than 5°.

17. A detector for calculating a depth of a buried conductor, the detector comprising:
   at least three antennas for detecting an electromagnetic field radiated by a buried conductor;
   a microprocessor configured to calculate the depth of said conductor based on the field detected by the antennas; and
   a display device for displaying the calculated depth of said conductor,
   wherein the microprocessor is configured to display the calculated depth on the display device when one or more predetermined criteria are satisfied, and wherein the antennas are vertically spaced and include a top horizontal antenna, a bottom horizontal antenna and a middle horizontal antenna disposed between the top antenna and the bottom antenna at a separation s from each antenna, or, the antennas include a bottom vertical antenna, a bottom horizontal antenna, a first middle horizontal antenna and a second middle horizontal antenna oriented substantially orthogonally to the first middle horizontal antenna.

18. A detector as claimed in claim 17, wherein the microprocessor is further configured to calculate an angle θ between the vertical and a line joining a bottom of the detector to the portion of the conductor located closest to the bottom of the detector, wherein a predetermined criterion is the angle θ is within ±10°.

19. A detector as claimed in claim 18, wherein the angle θ is within ±5°.

20. A detector as claimed in claim 19, wherein the angle θ is within ±2°.

21. A detector as claimed in claim 17, wherein the microprocessor is further configured to calculate an angle φ between an axis of said conductor and a plane perpendicular to an axis of the antennas, wherein a predetermined criterion is the angle φ is within ±10°.

22. A detector as claimed in claim 21, wherein the angle φ is within ±5°.

23. A detector as claimed in claim 22, wherein the angle φ is within ±2°.

24. A detector as claimed in claim 17, wherein the microprocessor is further configured to calculate the second derivative of the phase of the electromagnetic fields detected at the antennas, wherein a predetermined criterion is the second derivative of the phase is less than $0.5°/s^2$.

25. A detector as claimed in claim 24, wherein the second derivative of the phase is less than $0.2°/s^2$.

26. A detector as claimed in claim 25, wherein the second derivative of the phase is less than $0.1°/s^2$.

27. A detector as claimed in claim 17, wherein the microprocessor is further configured to calculate the standard deviation of the depth calculation referred to a 10 Hz bandwidth, wherein a predetermined criterion is the standard deviation of the depth calculation is less than 5%.

28. A detector as claimed in claim 27, wherein the standard deviation of the depth calculation is less than 2%.

29. A detector as claimed in claim 28, wherein the standard deviation of the depth calculation is less than 1%.

30. A detector as claimed in claim 17, further comprising an analogue to digital converter (ADC) having a dynamic range for digitising signals output from the antennas, wherein a predetermined criterion is the signals input to the ADC are within the dynamic range of the ADC.

31. A detector as claimed in claim 17, wherein the microprocessor is further configured to calculate a first derivative of a magnitude of the field detected at the antennas, wherein a predetermined criterion is the first derivative of the magnitude of the field detected at the antennas is less than 5%.

32. A detector as claimed in claim 31, wherein the first derivative of the magnitude of the field detected at the antennas is less than 2%.

33. A detector as claimed in claim 32, wherein the first derivative of the magnitude of the field detected at the antennas is less than 1%.

34. A detector as claimed in claim 17, wherein the microprocessor is further configured to calculate phase correlation across the antennas, wherein a predetermined criterion is the phase difference between the antennas is less than 5°.

35. A detector as claimed in claim 34, wherein the phase difference between the antennas is less than 2°.

36. A detector as claimed in claim 35, wherein the phase difference between the antennas is less than 1°.

* * * * *